United States Patent [19]
Wei

[11] 3,967,166
[45] June 29, 1976

[54] ELECTRONIC LOCK

[76] Inventor: Ching-Yeu Wei, 502 Dryden Road, Ithaca, N.Y. 14850

[22] Filed: Apr. 25, 1973

[21] Appl. No.: 354,248

[52] U.S. Cl. .............................. 317/141 S; 307/141; 307/10 AT
[51] Int. Cl.² .......................................... H01H 47/18
[58] Field of Search ............. 317/134, 141 R, 141 S; 307/141, 10 AT, 293, 10 R, 9; 340/64, 274; 70/419

[56] References Cited
UNITED STATES PATENTS

| | | | |
|---|---|---|---|
| 3,242,388 | 3/1966 | Tellerman | 317/134 |
| 3,576,536 | 4/1971 | Wolfe | 317/134 X |
| 3,614,458 | 10/1971 | Stein | 307/10 AT |
| 3,634,697 | 1/1972 | MacFarlane | 307/10 AT |
| 3,660,831 | 5/1972 | Nicola et al. | 317/134 X |
| 3,739,340 | 6/1973 | Moorefield | 317/134 X |
| 3,754,164 | 8/1973 | Zorzy | 317/134 |
| 3,764,859 | 10/1973 | Wood et al. | 317/134 |
| 3,772,574 | 11/1973 | Hughes | 317/134 |
| 3,781,804 | 12/1973 | Lederer, Jr. | 307/10 AT X |
| 3,790,933 | 2/1974 | Cort | 307/10 AT X |
| 3,796,889 | 3/1974 | Fradkin et al. | 307/10 AT |

*Primary Examiner*—James R. Scott
*Assistant Examiner*—William J. Smith

[57] ABSTRACT

An antitheft device comprising a timing circuit and preferably a rotary lock switch operated by a key will interrupt an utilization apparatus such as the ignition circuit of an automobile and sound an alarm unless the lock switch can be unlocked from a first locking position to a second locking position, and unless the lock switch can be unlocked from the second locking position to a third locking position neither earlier than a first predetermined time nor later than a second predetermined time after the lock switch is unlocked to the second locking position.

9 Claims, 1 Drawing Figure

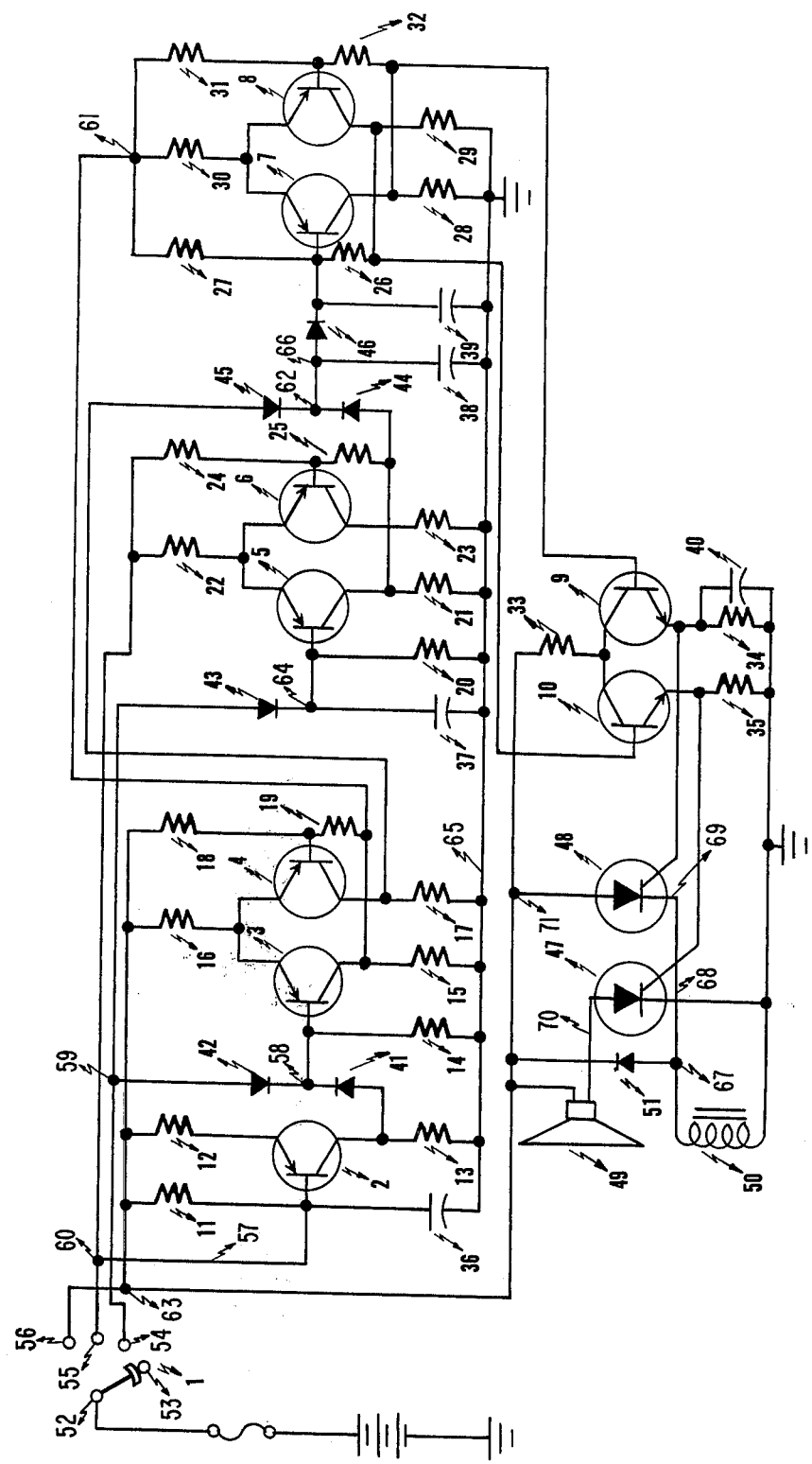

ELECTRONIC LOCK

DISCLOSURE OF THE INVENTION

The present invention relates to a timing lock switch designed to be used as an antitheft device for motor vehicles and/or as a safety lock for doors, safes, and other similar applications.

The present invention includes a multi-functional timing circuit which has three input terminals specified in a unique sequence as the first input terminal, the second input terminal, and the third input terminal and also substantially has two output terminals specified as the normal output terminal connected to an utilization apparatus such as the ignition circuit of an automobile and the alarm output terminal connected to an alarm device such as horns of an automobile. Three input terminals are respectively connected to three successive positions of a rotary switch which provides a convenient means to successively connect a source of electrical power such as the battery of an automobile to three input terminals of the timing circuit.

The present invention is characterized by a timing circuit which provides one unique means to switch the electrical power of a source to the normal output. The timing circuit will interrupt the normal output and sound an alarm unless the rotary switch is first switched to the first input terminal, unless the rotary switch is then successively switched to the second input terminal and stays not shorter than a first predetermined time, and unless the rotary switch is finally switched to the third input terminal not later than a second predetermined time.

The present invention thus provides an antitheft device that prevents any tampering with the system, including the jumping of the utilization apparatus, without a key under the presumption that a thief must take time, say a time longer than the second predetermined time, to unlock the lock switch from one locking position to the next locking position with a tool or tools in substitution for a key if a rotary lock switch operated by a key such as the conventional ignition lock switch of an automobile is used as the rotary switch.

Further details of the present invention can be seen in the accompanying drawing which is presented only by way of a demonstrative but not limiting example, wherein:

FIG. 1 is a preferably schematic circuit diagram showing the embodiments of the present invention.

A switch 1, preferably a rotary lock switch operated by a key, includes one pole 52 and four successive positions 53, 54, 55, and 56. The pole 52 is connected to a source of electrical power. The position 53 is nothing but an electrical "OFF" position at which the circuit drains zero current. The position 54 is connected with the first input terminal of the timing circuit. The position 55 is connected with the second input terminal of the timing circuit. The position 56 is the position which actually supplies the electrical power of a source to the outputs of the timing circuit. In other words, the electrical power of a source will not be switched to the outputs unless the switch 1 is finally switched to the position 56. It is noted that the position 54 may be used as an electrical "OFF" position, but the timing circuit will drain a small current, eg. 6 ma.

The timing circuit includes a first circuit, a second circuit, a third circuit, and a dual amplifier.

The first circuit includes a transistor 2; resistor 11, 12, and 13 connected respectively to the base, the emitter, and the collector of transistor 2; a capacitor 36 connected between the base of transistor 2 and the ground 65; and a Schmidt trigger comprising transistors 3 and 4 and substantially resistors 14 through 19. A trigger terminal 58 of the Schmidt trigger is connected to the base of transistor 3. The trigger terminal 58 and the collector of transistor 2 are bridged by a diode 41. A terminal 59 and the trigger terminal 58 may be bridged by a diode 42. It will be described later that the performance of the timing circuit may not be effected without the terminal 59 being connected to the trigger terminal 58. A conductor 57 connects a terminal 60 with the base of the transistor 2. A terminal 61 is connected to the collector of transistor 3. A diode 45 bridges a terminal 62 and the collector of transistor 4. The terminal 60 is the second input terminal of the timing circuit. Resistors 11, 12, 16, and 18 are connected to a terminal 63 which is the third input terminal of the timing circuit. The electrical power of a source is supplied to the first circuit at the terminal 63.

It will be thus seen that the transistor 3 remains off whenever a source of electrical power is simultaneously connected to the terminal 59 and the terminal 63.

If only the terminal 63 is connected to a source of electrical power with terminals 59 and 60 being isolated, the transistor 2 will be on until the capacitor 36 is charged to the voltage of a source by the base current of transistor 2 and a current flowing through the resistor 11. Consequently, the transistor 3 will remain off or equivalently the transistor 4 remain on until the transistor 2 is switched off. Hence, the second circuit may function as a time delay SPDT relay.

If both terminals 60 and 63 are simultaneously connected to a source of electrical power with the terminal 59 being isolated, the transistor 2 will be on until the capacitor 36 is charged to the voltage of a source by the base current of transistor 2 and currents flowing through the resistor 11 and the conductor 59. Consequently, the transistor 3 will remain off or equivalently the transistor 4 will remain on until the transistor 2 is switched off. Hence, the second circuit may again function as a time delay SPDT relay. However, if the terminal 60 is connected to a source of electrical power first for a time long enough to charge the capacitor 36 to the voltage of a source, the transistor 3 will be switched on without any time delay at the moment the terminal 63 is connected to a source of electrical power.

It will be described later that the time required to charge the capacitor 36 to the voltage of a source provides a holding means that will hold the transistor 4 in the conduction state for a first predetermined time, eg. 0.1 second, which determines the minimum time the switch 1 has to stay at the position 55 before being switched to the position 56. The conductor 57 may be optionally substituted by a resistor (not shown in FIG. 1) to increase the first predetermined time, but usually it is not necessary in the practical case.

The second circuit includes a Schmidt trigger comprising transistors 5 and 6 and substantially resistors 20 through 25; and a capacitor 37 connected between a trigger terminal 64 of the Schmidt trigger and the ground 65. The trigger terminal 64 is connected to the base of transistor 5. A diode 43 connects the trigger terminal 64 to the first input terminal of the timing circuit. Resistors 22 and 24 are connected together to the terminal 60. The electrical power of a source is supplied to the second circuit at the terminal 60. The collector of transistor 5 and the terminal 62 are bridged by a diode 44.

It will be seen that the transistor 5 will be conductive unless the terminal 64 is at a voltage high enough to switch the transistor 5 off.

If the terminal 64 is first connected to a source of electrical power, the capacitor 37 will be instantly charged to the voltage of a source; and then if the terminal 64 is disconnected and the terminal 60 is connected simultaneously to a source of electrical power, the transistor 5 will remain off until the capacitor 37 is discharged to a voltage low enough to switch the transistor 5 on. Hence, the second circuit may function as a time delay SPDT relay if the capacitor 37 is precharged to the voltage of a source. It will be described later that the time required to discharge the capacitor 37 to a voltage low enough to switch the transistor 5 on determines a second predetermined time, eg. 5 seconds, for which the switch 1 is permitted to stay at the position 55.

The third circuit includes a Schmidt trigger comprising transistors 7 and 8, substantially resistors 26 through 32, a capacitor 39 connected to the base of transistor 7, a capacitor 38 connected to a trigger terminal 66 of the Schmidt trigger, and a diode 46 connected between the trigger terminal 66 and the base of transistor 7. The trigger terminal 66 is connected to the terminal 62.

The third circuit is supplied with electrical power at the terminal 61 when the transistor 3 is in the conduction state. The capacitor 38 can be charged and functions as a temporary memory unit whenever there is or there was a voltage at the trigger terminal 66. The capacitor 39 virtually grounds the base of transistor 7 such that the transistor 7 is more preferably switched on than the transistor 8 at the moment the third circuit is supplied with electrical power at the terminal 61. The diode 46 is such that the capacitor 38 stores the output voltage appearing at the terminal 66 only.

It is noted that the conduction of transistor 7 indicates that the electrical power of a source is switched to the normal output while the conduction of transistor 8 indicates that the electrical power of a source is switched to the alarm output.

If there is and/or there was a voltage supplied to the trigger terminal 66 and as long as the voltage across the capacitor 38 still remains high enough to trigger the Schmidt trigger, the transistor 7 will remain off or equivalently the transistor 8 will remain on until the voltage across the capacitor 38 becomes too low to trigger the Schmidt trigger. Hence, the third circuit may function as a time delay SPDT relay.

The voltage at the collector of transistor 7 is then amplified by a first amplifier comprising a transistor 9, resistors 33 and 34, and a capacitor 40 to trigger a silicon controlled rectifier 48. A terminal 69, the normal output terminal, is connected to the cathode of silicon controlled rectifier 48. A conductor 68 may bridge the terminal 69 and a terminal 67 which is connected to an utilization apparatus such as the ignition circuit of an automobile. The apparatus 50 is thus supplied with the electrical power of a source via the silicon controlled rectifier 48. The anode of the silicon controlled rectifier 48 is connected to a terminal 71 which is connected to the terminal 63.

The capacitor 40 prevents the silicon controlled rectifier 48 being triggered by a false pulse of a short duration such as in case the transistor 7 is accidentally switched on for a short time prior to the transistor 8 is finally switched on, but the capacitor 40 is not at all indispensable.

The voltage at the collector of transistor 8 is then amplified by a second amplifier comprising a transistor 10 and resistors 33 and 35 to trigger a silicon controlled rectifier 47 and thus sound an alarm 49. A terminal 70, the alarm output terminal, is connected to the anode of the silicon controlled rectifier 47. The cathode of the silicon controlled rectifier 47 is connected to the ground 65. The alarm 49 may connect the terminal 70 to the terminal 63 or the pole 52. It is noted that the alarm may bridge the cathode of the silicon controlled rectifier 47 and the ground if the cathode is used as the alarm output terminal and the terminal 70 is connected to the terminal 63 or the pole 52.

It should be noted that silicon controlled rectifier 47 or 48 is used only for a convenient power amplifier and thus may be substituted by a power transistor or a mechanical relay, if so desired.

It should be also noted that the first circuit, the second circuit, or the third circuit may be substituted by a time delay relay with suitable modification and arrangement as it was successful in our original design.

A diode 51 connects the terminal 67 to the position 56 (or the terminal 63). The diode 51 prevents the electrical power of a source via the position 56 being switched directly to the utilization apparatus 50 bypassing the timing circuit. It is seen that the position 56 will be simultaneously at the voltage of a source if the terminal 67 is jumped to a source of electrical power, which provides the only way to jump the electrical power of a source to the position 56 if the switch 1 is installed at a place not easily reached as it is in most of practical cases.

The timing circuit with the diode 51 being connected between the third input terminal and the normal output terminal as shown in FIG. 1 can recognize the switching history of the switch 1 and determines which output terminal the electrical power of a source will be switched to.

Since the switch 1 and the timing circuit including the diode 51 will be installed at a place not easily reached such as a steering housing of an automobile, only the terminal 67 and the pole 52 can be readily reached. However, it will be shown that any tampering with the present invention without a key by any combination technique of the "jumping" of the terminal 67 and the "removing" of a source of electrical power from the pole 52 can not activate the timing circuit to switch the electrical power of a source to the normal output terminal.

As the switch 1 is switched to the position 54, the capacitor 37 is instantly charged to the voltage of source. It is evident that there is no limitation of time for the switch 1 to stay at the position 54 which actually does nothing but charge the capacitor 37. Simultaneously, the capacitor 37 will discharge through the resistor 20 and the capacitor 36 will be charged through the conductor 57 or a resistor in substitution for the conductor 57 if so desired, if the switch 1 is then successively switched to the position 55. Consequently, if the switch 1 is switched to the position 56 earlier than the first predetermined time after the switch 1 is switched to the position 55, the transistor 3 will remain off until the transistor 2 is switched off, the momentary conduction of the transistor 4 will charge the capacitor 38 and be memorized and subsequently the transistor 7 will remain off or equivalently the transistor 8 will be switched on as the transistor 3 becomes conductive; and if the switch 1 is switched to the position 56 not earlier than the first predetermined time and not later than the second predetermined time, the transistor 5 will remain off and the transistor 3 will be instantly switched on to switch the transistor 7 on. However, if the switch 1 is not switched to the position 56 after passage of the second predetermined time, the transistor 5 will be switched on and a current flowing through the diode 44 will charge the capacitor 38 such that the transistor 7 will remain off if the switch 1 is switched to the position 56 thereafter.

It should be noted that the second predetermined time becomes zero if the switch 1 has not been switched to the position 54 to charge the capacitor 37. Hence, it is strict for the switch 1 to be first switched to the position 54 to charge the capacitor 37 before being switched to the position 55.

If a source of electrical power is connected to the position 56 by the jumping of the terminal 67 with the switch 1 being at the position 53, the momentary conduction of transistor 4 will switch the transistor 7 off and the transistor 8 on if thereafter the transistor 3 is switched on.

If a source of electrical power is connected to the position 56 by the jumping of the terminal 67 with the switch 1 being at the position 54, the transistor 3 remains off since the trigger terminal 58 is at the voltage of a source and consequently both transistors 7 and 8 remain off. It will be seen that the transistor 7 will be switched off and the transistor 8 be switched on if the trigger terminal 58 is not connected to the terminal 59. It is thus clear that the connection of the trigger terminal 58 and the terminal 59 may not be needed.

If the source of electrical power is connected to position 55 and 56 simultaneously bypassing the position 54 by combing the jumping of the terminal 67 with the removing of a source of electrical power, the transistor 5 will be instantly switched on and a current flowing through the diode 44 will charge the capacitor 38 while the transistor 3 remains off until the transistor 2 is switched off. If the transistor 3 is switched on before the capacitor 38 is charged to a voltage high enough to switch the transistor 7 off, the transistor 7 will be switched on first and thus the silicon controlled rectifier 48 will be triggered on. The silicon controlled rectifier 48 will remain on even if the transistor 7 is switched off by the charged capacitor 38 thereafter. In other words, the electrical power of a source is thus switched to both the normal output terminal and the alarm output terminal. On the contrary, if the transistor 3 remains off before the capacitor 38 is charged to a voltage high enough to switch the transistor 7 off, the transistor 7 will remain off after the transistor 3 is switched on. In other words, the electrical power of a source is switched to the alarm output terminal only. It is thus clear that the limitation of the first predetermined time is strict.

It is thus apparent that the present invention provides an antitheft device which will interrupt the normal output and sound an alarm unless the switch 1 is first switched to the position 54 (requirement 1), unless the switch 1 is then successively switched to the position 55 and stays not shorter than the first predetermined time (requirement 2), and unless the switch 1 is finally switched to the position 56 not later than the second predetermined time (requirement 3). It should be noted that all the actions of switching the switch 1 above described are performed with a source of electrical power being connected to the pole 52.

It is also apparent that any tampering with the present invention without a key described and/or not described in the foregoing description will be prevented since none of them fulfill the three requirements above described completely.

It should be noted that the present invention is designed such that it switches the electrical power of a source to the normal output terminal only if the three requirements are fulfilled, which naturally permits the present invention to provide an antitheft device, particularly applicable to an automobile where the ignition circuit can be easily reached in most of cases, that will not permit a thief to disconnect the ignition circuit from the present invention prior to the jumping of the ignition circuit if an extra sealed utilization apparatus (not shown in FIG. 1) which also requires electricity for operation is connected to the normal output terminal. Said sealed utilization apparatus such as preferably an electrical steering column lock of an automobile may be connected between the terminal 69 and the ground with a diode in substitution for the conductor 68. Said diode will prevent the current flowing backward to activate said sealed utilization apparatus as the electrical power of a source is jumped to the ignition circuit. Said sealed utilization apparatus is thus activated only when the timing circuit switched the electrical power of a source to the normal output terminal.

If the present invention is used as a safety lock for a door, a safe or other similar applications where the present invention including the apparatus 50 is beyond the reach and thus any tampering with the present invention by the jumping of the apparatus 50 is not possible, not only the sealed utilization apparatus is not needed but the timing circuit may be simplified. The diode 51, for example, may not be needed. Therefore, as long as the electrical power of a source is not switched to the normal output terminal, the sealed utilization apparatus or the apparatus 50 if sealed will by no means be activated or unlocked. Hence, the present invention is in no way limited to the use of an alarm. The alarm does nothing but further scare away a thief and thus is not at all indispensable for the present invention.

It is further apparent that the circuit described is not a limiting example at all and is subject to be varied and modified according to the practical requirements without departing from the scope of the present inventive concept. If so desired, the lock switch may be, for example, substituted by two SPDT lock switches uniquely specified as the first lock switch and the second lock switch which are arranged such that the second lock switch has to be unlocked neither earlier than the first predetermined time nor later than the second predetermined time after the first lock switch is unlocked.

Having thus described the invention and illustrated its use, what is claimed as new and is desired to be secured by Letters Patent is:

1. An antitheft device comprising, in combination:
   a switching device including at least two switching actions; and
   a timing device which is activated only when a first and a second predetermined one of said switching actions are conducted in sequence and said second predetermined switching action is conducted neither earlier than a first predetermined time nor later than a second predetermined time after the moment when said first predetermined switching action is conducted including:
a. a first circuit connected to said switching device for sensing said first predetermined switching action will be activated when said first predetermined switching action is conducted and will be later de-activated unless said second predetermined switching action is followed not later than said second predetermined time after said first predetermined switching action is conducted;
b. a second circuit connected to said switching device for sensing said second predetermined switching action will not be activated unless said second predetermined switching action is conducted not earlier than said first predetermined time after said first predetermined switching action is conducted;
c. a gating circuit connected to said first and second circuits will be activated only when both said first and second circuits are activated, and whereby said timing device is activated when said gating circuit is activated.

2. An antitheft device as in claim 1 wherein said switching device includes key-operated lock switches.

3. An antitheft device as in claim 2 wherein said switches include a rotary switch.

4. An antitheft device as in claim 1 wherein said first circuit includes a time delay relay having the time delay action responsible to said second predetermined time.

5. An antitheft device as in claim 4 wherein said time delay relay includes a Schmidt trigger and a capacitor defining the time delay connected between the trigger terminal of said Schmidt trigger and the ground.

6. An antitheft device as in claim 1 wherein said second circuit includes a time delay relay having the time delay action responsible to said first predetermined time.

7. An antitheft device as in claim 6 wherein said time delay relay includes: a Schmidt trigger; and a circuit defining the time delay including a transistor, a first resistor connected to the base of said transistor, a second resistor connected to the emitter of said transistor, a third resistor connected to the collector of said transistor, and a capacitor connected between the base of said transistor and the ground; and whereby the emitter of said transistor is connected to the trigger terminal of said Schmidt trigger.

8. An antitheft device as in claim 1 further comprising a memory circuit connected to said gating circuit for storaging any deactivation records of said first and second circuits, and whereby said gating circuit will not be activated whenever there were or are any de-activation records of said first and second circuits storaged in said memory circuit.

9. An antitheft device as in claim 8 wherein said gating circuit includes a Schmidt trigger, a first capacitor connected to the trigger terminal of said Schmidt trigger, and a diode with the cathode being connected to said trigger terminal; and said memory circuit includes a second capacitor connected to the anode of said diode.

* * * * *